US005552918A

United States Patent [19]
Krug et al.

[11] Patent Number: 5,552,918
[45] Date of Patent: Sep. 3, 1996

[54] TRANSMISSION AND RECEPTION MODULE FOR A BIDIRECTIONAL OPTICAL COMMUNICATION AND SIGNAL TRANSMISSION

[75] Inventors: Joachim Krug, Neutraubling; Hans-Ludwig Althaus, Lappersdorf; Alfred Hartl, Pettendorf; Gerhard Kuhn, Köfering, all of Germany

[73] Assignee: Siemens Aktiengesellschaft, Munich, Germany

[21] Appl. No.: 539,832

[22] Filed: Oct. 6, 1995

[30] Foreign Application Priority Data

Oct. 6, 1994 [DE] Germany ............... 44 35 768.0

[51] Int. Cl.⁶ ...................................... H04B 10/00
[52] U.S. Cl. .................. 359/152; 359/131; 385/33; 385/47
[58] Field of Search ........................ 359/113, 152, 359/163, 127, 130, 131, 129; 385/24, 47, 33

[56] References Cited

U.S. PATENT DOCUMENTS

| | | | |
|---|---|---|---|
| 4,262,362 | 4/1981 | Kiernan et al. | 359/114 |
| 4,431,258 | 2/1984 | Fye | 359/129 |
| 4,767,171 | 8/1988 | Keil et al. | 359/114 |
| 4,981,335 | 1/1991 | Gaebe | 385/33 |
| 5,066,089 | 11/1991 | Greil et al. | 385/35 |
| 5,127,075 | 6/1992 | Althaus et al. | 385/47 |
| 5,416,624 | 5/1995 | Karstensen | 359/152 |

FOREIGN PATENT DOCUMENTS

| | | | |
|---|---|---|---|
| 0238977 | 9/1987 | European Pat. Off. | G02B 6/42 |
| 0400161 | 12/1990 | European Pat. Off. | G02B 6/42 |
| 0463214 | 1/1992 | European Pat. Off. | G02B 6/42 |
| 0542011 | 5/1993 | European Pat. Off. | G02B 6/42 |
| 62-2217 | 1/1987 | Japan | G02B 6/42 |
| 89/08277 | 9/1989 | WIPO | G02B 6/42 |

Primary Examiner—Leo Boudreau
Assistant Examiner—Rafael Barares
Attorney, Agent, or Firm—Herbert L. Lerner; Laurence A. Greenberg

[57] ABSTRACT

A transmission and reception module for a bidirectional optical communication and signal transmission includes a light transmitter having a first lens coupling optical element, and a light receiver. A fiber connection has a second lens coupling optical element for a common optical waveguide. A beam splitter is disposed in a free beam path. A common housing surrounds the foregoing. The light transmitter, the beam splitter and the fiber connection as well as the light receiver which is orthogonal thereto, are disposed axially symmetrically. An optical axis of the first lens coupling optical element is axially offset from an optical axis of the light transmitter, an optical axis of the second lens coupling optical element is axially offset from the optical axis of the fiber connection, the end surface of the fiber connection, given optimal coupling-in of light, has an angle of inclination relative to its optical axis, and the beam splitter is inclined relative to an axis of symmetry of the configuration, such that backreflected radiation strikes neither a radiation-active part of the light transmitter nor a radiation-sensitive part of the light receiver.

6 Claims, 1 Drawing Sheet

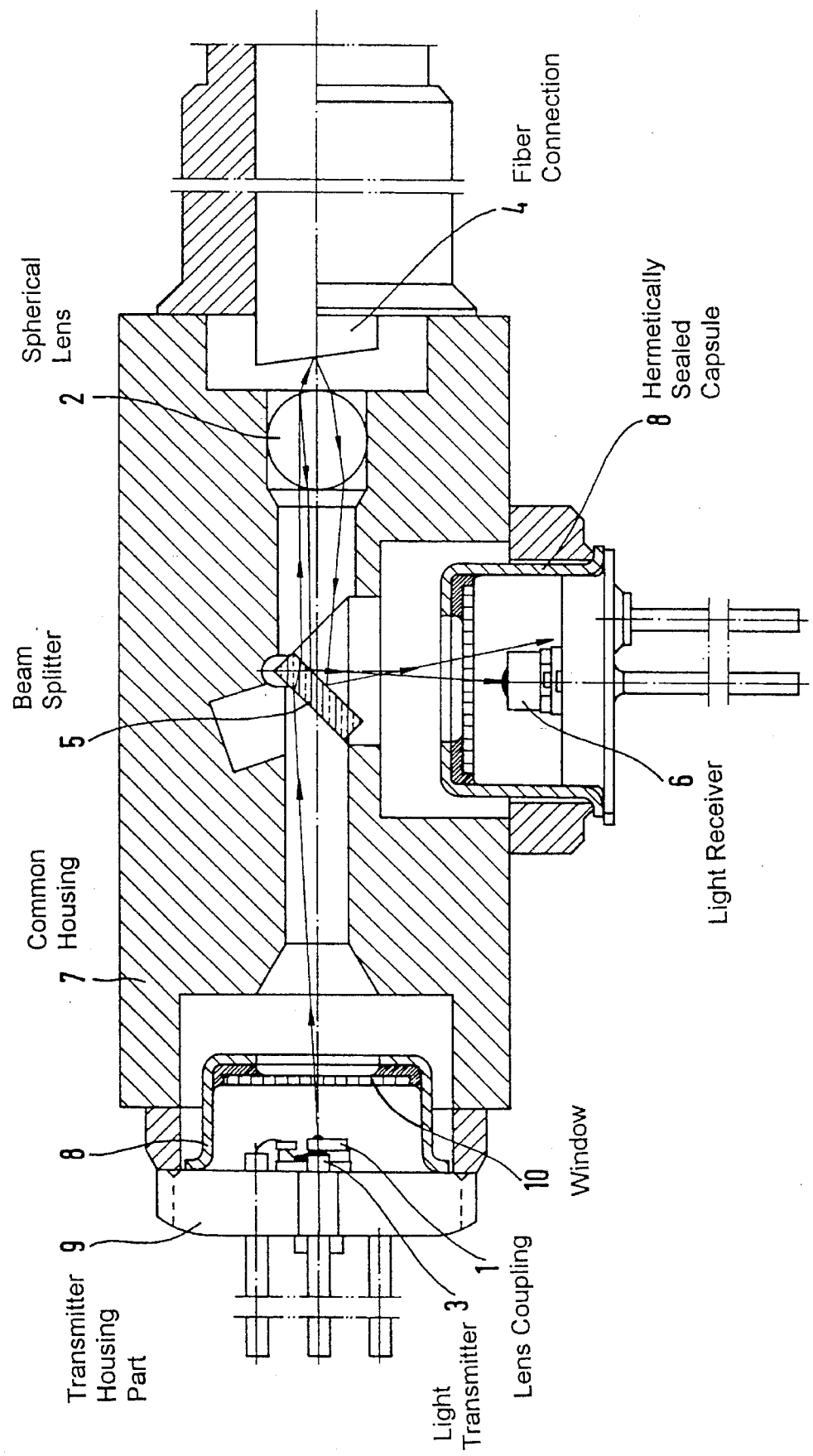

TRANSMISSION AND RECEPTION MODULE FOR A BIDIRECTIONAL OPTICAL COMMUNICATION AND SIGNAL TRANSMISSION

BACKGROUND OF THE INVENTION

1. Field of the Invention

The invention relates to a transmission and reception module for a bidirectional optical communication and signal transmission, having a light transmitter with a first lens coupling optical element, a light receiver, a fiber connection with a second lens coupling optical element for a common optical waveguide, and a beam splitter disposed in a free beam path, which are all surrounded by a common housing, the light transmitter, the beam splitter and the fiber connection, as well as the light receiver which is orthogonal to them, are disposed axially symmetrically.

One such bidirectional module with free beam guidance is known from European Patent Application 0 238 977 A2, corresponding to U.S. Pat. No. 4,767,171. In that transmission and reception module for a bidirectional communication network, two spherical lenses are spaced apart and disposed essentially between a laser diode and one end of an optical fiber in order to focus the laser light on the fiber end. Disposed between the spherical lenses is a beam separator or a beam splitter, which splits light, projected from the fiber end divergently toward the lens remote from the transmitter, which light is formed into a beam by that lens, at a wavelength other than the wavelength of the laser light, from the beam path. The split path is directed it to a detector or light receiver.

A special embodiment of such a module, in which the light transmitter and the light receiver, each forming an independent component, are surrounded by a hermetic capsule and inserted into a common housing with the beam splitter, is described in European Patent Application 0 463 214 A1, corresponding to U.S. Pat. No. 5,127,075.

It is also known from European Patent Application 0 400 161 A1, corresponding to U.S. Pat. No. 5,066,089, to reduce troublesome backreflections, in a configuration for optical coupling of an electrooptical converter module with an optical waveguide, without reducing the coupling efficiency of the configuration, through the use of two lenses, the first of which is disposed upstream of the converter module and the second of which is disposed upstream of the optical waveguide. The optical axis of the first lens is axially offset from the optical axis of the converter module, the optical axis of the second lens is axially offset from the optical axis of the optical waveguide, and the optical axes of the first lens and the second lens are axially offset from one another.

It is known that the proportion of reflection, which repeatedly occurs at the optical boundary surfaces in modules with optical free beam guides, and which reduces the transported light output, can also be reduced to proportions of $\leq 1\%$, by coating the optical boundary surfaces.

Nevertheless, in an electrooptical bidirectional module, two problems of a special type still occur, which negatively affect the output capacity of the module. First, high-power laser diodes as light transmitters are extremely sensitive to the smallest proportions of negative feedback light ($\leq 0.01\% \hat{=} -40$ dB) and react with increased noise. Second, in bidirectional modules and especially modules that use a wavelength, all of the reflected proportions of light ($<1\% \hat{=} <-20$ dB) that arrive at the optical beam path contribute substantially to undesirable crosstalk between the transmission and reception channels.

An attempt has already been made to counteract this problem by providing all of the optical boundary surfaces with the best possible, and therefore expensive, coating. However, those coatings are very difficult or expensive to apply, especially to fiber boundary surfaces. Among other reasons, the fiber boundary surfaces are in particular located precisely in the most optically sensitive focused beam region, where backreflection into the optical beam path is highest. Moreover, the reduced reflection ($<1\%$) achieved by the coating is not enough for the full power of the particular module to be reached.

SUMMARY OF THE INVENTION

It is accordingly an object of the invention to provide a transmission and reception module for a bidirectional optical communication and signal transmission, which overcomes the hereinafore-mentioned disadvantages of the heretofore-known devices of this general type and in which, at an optimal optical coupling efficiency, both troublesome backreflections and undesired crosstalk are substantially reduced.

With the foregoing and other objects in view there is provided, in accordance with the invention, a transmission and reception module for a bidirectional optical communication and signal transmission, comprising a light transmitter with a radiation-active part and an optical axis, the light transmitter having a first lens coupling optical element with an optical axis; a fiber connection with an end surface and an optical axis, the fiber connection having a second lens coupling optical element with an optical axis for a common optical waveguide; a beam splitter disposed in a free beam path; a light receiver wish a radiation-sensitive part, the light receiver being orthogonal to the light transmitter, the beam splitter and the fiber connection; and a common housing defining an axis of symmetry and surrounding the light transmitter, the first optical element, the fiber connection, the second optical element, the beam splitter and the light receiver; the light transmitter, the beam splitter, the fiber connection and the light receiver being disposed axially symmetrically; the optical axis of the first lens coupling optical element being axially offset from the optical axis of the light transmitter, and the optical axis of the second lens coupling optical element being axially offset from the optical axis of the fiber connection, said end surface of the fiber connection having, at a given optimal coupling-in of light, an angle of inclination relative to the optical axis of the fiber connection, and the beam splitter being inclined relative to the axis of symmetry, so that backreflected radiation strikes neither the radiation-active part of the light transmitter nor the radiation-sensitive part of the light receiver.

In accordance with another feature of the invention, the housing has an inner wall surface to which the beam splitter is secured.

In accordance with a further feature of the invention, the second lens coupling optical element is a spherical lens being adjusted and fixed to the inner wall surface of the housing in front of the fiber connection.

In accordance with an added feature of the invention, there are provided hermetically sealed capsules, the light transmitter and the light receiver each forming an independent component being inserted into the common housing and surrounded by a respective one of the hermetically sealed capsules.

In accordance with an additional feature of the invention, the first lens coupling optical element is a lens being integrated into a carrier chip and is secured in front of the light transmitter.

In accordance with a concomitant feature of the invention, the optical axis of the first lens coupling optical element is axially offset relative to the optical axis of the light transmitter, and the optical axis of the second lens coupling optical element is axially offset relative to the optical axis of the fiber connection, causing divergent radiation generated by the light transmitter to emerge from the first lens coupling optical element at a first tilt angle of approximately 3° relative to the axis of symmetry and to emerge from the second lens coupling optical element at a second tilt angle of approximately 5.5° relative to the axis of symmetry; and the end surface of the fiber connection is adapted to the second tilt angle and is inclined at an angle of inclination of approximately 12° from the vertical relative to the optical axis.

The advantages attained with the invention are in particular that on one hand the noise of the light transmitter from backreflection is prevented, and that on the other hand the problem of crosstalk between the light transmitter and the light receiver is minimized (less than −30 dB). These two substantial advantages complement one another. In other words, if the non-axial beam geometry in the light transmission direction is adjusted to optimal light coupling-in, then at the same time the proportion of light fed back to the receiver diode is minimal. Another advantage is that because of the optical beam guidance provided, a symmetrical and therefore more economical modular construction of the individual elements in the interior of the modular housing is possible.

Other features which are considered as characteristic for the invention are set forth in the appended claims.

Although the invention is illustrated and described herein as embodied in a transmission and reception module for a bidirectional optical communication and signal transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE of the drawing is a fragmentary, diagrammatic, cross-sectional view of an exemplary embodiment of the invention.

DESCRIPTION OF THE PREFERRED EMBODIMENTS

Referring now to the single figure of the drawing in detail, there is seen a bidirectional transmission and reception module that substantially includes a light transmitter 3 which has a first lens coupling optical element 1 and is preferably a laser diode, a light receiver 6 which, for instance, is a photodiode, a fiber connection 4 which has a second lens coupling optical element 2 for a common optical waveguide, and a beam splitter 5 disposed in a free beam path, all of which are surrounded by a common housing 7. The light transmitter 3, the beam splitter 5 and the fiber connection 4, as well as the light receiver 6 which is disposed orthogonally to them, are all disposed axially symmetrically.

The beam splitter 5 is suitably secured to an inner wall surface of the housing 7. The second lens coupling optical element 2, which preferably is a spherical lens, is adjusted and secured upstream of the fiber connection 4 on the inner wall surface of the housing 7.

The light transmitter 3 and the light receiver 6, preferably each forming an independent component and being surrounded by a hermetically sealed capsule 8, are built into the common housing 7.

In this preferred exemplary embodiment, the first lens coupling optical element 1 which is in the form of a convex lens integrated into a carrier chip, such as a silicon chip, is secured in front of the light transmitter 3.

The optical axis of the first lens coupling optical element 1 is axially offset from the optical axis of the light transmitter 3, and the optical axis of the second lens coupling optical element 2 is axially offset from the optical axis of the fiber connection 4, the end surfaces of the fiber connection 4 form an angle of inclination to its optical axis, and the beam splitter 5 is inclined to the axis of symmetry of the configuration in such a way that, backreflected radiation strikes neither a radiation-active part of the light transmitter 3 nor a radiation-sensitive part of the light receiver 6.

A free beam guidance between the electrooptical components, such as the light transmitter 3, the light receiver 6 and the fiber connection 4, is accordingly not located in the optical axis of the individual components that is determined by their geometrical symmetry. This results in the lens coupling optical element 1 in front of the light transmitter 3 being maladjusted laterally out of the beam axis and fixed, so that the radiation emerging from the lens coupling optical element 1 leaves an independent transmitter housing part 9 at a tilt angle of preferably approximately 3° from the mechanical axis. This radiation thus also no longer strikes a window 10 of the transmitter housing part 9 perpendicularly, nor is it reflected back upon the light transmitter 3 itself. This radiation, which is extended onward at the tilt angle of approximately 3°, then strikes the beam splitter 5 at such an orientation that it is diffracted back again to the axis of the common housing 7. As a result, an expensive, non-symmetrical housing is not necessitated by the preselected tilt angle. In other words, the common housing 7 can remain symmetrical, with the optical elements indicated.

In further beam guidance for coupling in or projection by the lens coupling optical element 2, the radiation is guided through the lens 2 in such a way that in the beam direction downstream of this lens 2, it undergoes a negative tilt angle from the mechanical axis (axis of symmetry) of approximately 5.5°. The radiation is thus deflected back toward the axis of symmetry to its focal point and at that location strikes the intensive-reflection end surface of the fiber connection 4. This surface, which is then adapted to the tilt angle of approximately −5.5°, is inclined from the optical axis by approximately 12° from the vertical. Thus in obedience to the law of refraction, the maximum proportion of the light or laser beam is coupled into the fibers, that is nearly the same proportion of light as in the case of vertical arrival at the end surface of the fiber.

The oblique or inclined end surface of the fiber connection 4, which conventionally, even in other optical waveguide components, prevents backreflection to the laser diode or back into the path, in this case in a bidirectional module not only contributes to eliminating backreflection but also to preventing crosstalk. Firstly, due to the angle of inclination of the fiber end surface, the arriving oblique radiation is reflected by twice its angle from the optical axis and thus is effectively moved away from the optical axis toward the light transmitter 3. Secondly, however, the reflected portion is also reflected out of the reception range of the light receiver 3 by twice the reflection angle as compared with the incident angle. On one hand, this prevents noise of the light transmitter from backreflection, and on the other hand it minimizes crosstalk between the light transmitter 3 and the light receiver 6.

We claim:

1. A transmission and reception module for a bidirectional optical communication and signal transmission, comprising:

a light transmitter with a radiation-active part and an optical axis, said light transmitter having a first lens coupling optical element with an optical axis;

a fiber connection with an end surface and an optical axis, said fiber connection having a second lens coupling optical element with an optical axis for a common optical waveguide;

a beam splitter disposed in a free beam path;

a light receiver with a radiation-sensitive part, said light receiver being orthogonal to said light transmitter, said beam splitter and said fiber connection; and a common housing defining an axis of symmetry and surrounding said light transmitter, said first optical element, said fiber connection, said second optical element, said beam splitter and said light receiver;

said light transmitter, said beam splitter, said fiber connection and said light receiver being disposed axially symmetrically;

said optical axis of said first lens coupling optical element being axially offset from said optical axis of said light transmitter, and said optical axis of said second lens coupling optical element being axially offset from said optical axis of said fiber connection, said end surface of fiber connection having, at a given optimal coupling-in of light, an angle of inclination relative to said optical axis of said fiber connection, and said beam splitter being inclined relative to said axis of symmetry, so that backreflected radiation strikes neither said radiation-active part of said light transmitter nor said radiation-sensitive part of said light receiver.

2. The module according to claim 1, wherein said housing has an inner wall surface to which said beam splitter is secured.

3. The module according to claim 1, wherein said housing has an inner wall surface, and said second lens coupling optical element is a spherical lens being adjusted and fixed to said inner wall surface of said housing in front of said fiber connection.

4. The module according to claim 1, including hermetically sealed capsules, said light transmitter and said light receiver each forming an independent component being inserted into said common housing and surrounded by a respective one of said hermetically sealed capsules.

5. The module according to claim 1, wherein said first lens coupling optical element is a lens being integrated into a carrier chip and is secured in front of said light transmitter.

6. The module according to claim 1, wherein:

said optical axis of said first lens coupling optical element is axially offset relative to said optical axis of said light transmitter, and said optical axis of said second lens coupling optical element is axially offset relative to said optical axis of said fiber connection, causing divergent radiation generated by said light transmitter to emerge from said first lens coupling optical element at a first tilt angle of approximately 3° relative to said axis of symmetry and to emerge from said second lens coupling optical element at a second tilt angle of approximately 5.5° relative to said axis of symmetry; and said end surface of said fiber connection is adapted to said second tilt angle and is inclined at an angle of inclination of approximately 12° from the vertical relative to said optical axis.

* * * * *